UNITED STATES PATENT OFFICE 2,682,520

MODIFIED POLYVINYL ACETAL RESIN COMPOSITION

Charles Kilbourne Bump, Hampden, and Frank J. Quinn, Springfield, Mass., assignors to Monsanto Chemical Company, St. Louis, Mo., a corporation of Delaware No Drawing. Application October 29, 1952,
Serial No. 317,574

14 Claims. (Cl. 260—33.4)

This invention relates to modified polyvinyl acetal resin compositions. More particularly, this invention relates to modified polyvinyl acetal resin compositions that adhere tenaciously to metal surfaces.

It is frequently desirable to apply adherent coatings to metal surfaces for various purposes. Polyvinyl acetal resin compositions have been used for this purpose and, while adherent coatings can be prepared from such compositions, past results have not been entirely satisfactory in one respect or another. Particular difficulty has been encountered in obtaining satisfactory adhesion to highly polished metal surfaces such as chromium or nickel plated surfaces.

Accordingly, an object of the present invention is the provision of modified polyvinyl acetal resin compositions.

Another object is the provision of modified polyvinyl acetal resin compositions having a strong affinity for metal surfaces.

These and other objects are attained by incorporating a compatible amount of a divalent heavy metal salt of fluorboric acid into a polyvinyl acetal resin.

The following examples are given in illustration and are not intended as limitations on the scope of this invention. Where parts are mentioned, they are parts by weight. The polyvinyl butyral resin used throughout the following examples contained approximately 18% hydroxyl groups calculated as polyvinyl alcohol and approximately 2% acetate groups calculated as polyvinyl acetate, the balance being substantially butyral.

Example I

In order to prepare a composition for use as a laminating interlayer, malaxate 100 parts of polyvinyl butyral resin, 40 parts of dibutyl Cellosolve adipate plasticizer and 1 part of lead fluorborate in a Banbury mixer or other suitable apparatus. The resultant composition is a stiff doughy mass. Sandwich a layer of the thus-prepared dough having a thickness of about 0.1" between a pair of chromium plated steel sheets and subject the assembly to a temperature of about 275° F. and a pressure of about 250 p. s. i. for 10 minutes. As a result of this treatment the polyvinyl acetal resin composition is formed into a solid sheet of interlayer that adheres tenaciously to the chromium plating. On separating the interlayer from the metal sheets the chromium plating adheres to the interlayer and is torn from the steel plates.

As an alternate procedure, place the stiff doughy mass formed by the malaxation of the above designated ingredients in the proportions specified in a suitable waxed chase and subject it to a pressure of 250 p. s. i. and a temperature of 275° F. for 30 minutes. A solid cake of resin is formed. When the cake has cooled, skive it into sheets about 0.015" thick. Sandwich a thus-prepared sheet of the resin composition between a pair of chromium plated steel sheets and subject this assembly to a temperature of about 275° F. and a pressure of about 250 p. s. i. for about 2 minutes. An exceedingly strong laminate is formed and when the resinous interlayer is pulled from the metal sheets, the chromium plating adheres to the interlayer and is torn from the steel plates.

Equally strong adhesion is obtained when this composition is bonded directly to the surfaces of steel plates by the above methods.

Example II

Malaxate 100 parts of polyvinyl butyral resin, 40 parts of dibutyl Cellosolve adipate plasticizer and 1 part of tin fluorborate in a Banbury mixer in order to form a stiff dough and place a layer of the dough about 0.1" thick between a pair of chromium plated steel sheets. Subject the assembly to a temperature of 275° F. and a pressure of 250 p. s. i. for 10 minutes. The resinous composition is formed into a solid interlayer that is strongly adherent to the chromium plating and, when the metal sheets and the interlayer are parted, the chromium plating adheres to the interlayer and is torn from the steel sheets.

Alternately, malaxate a similar mixture of 100 parts of polyvinyl butyral resin, 40 parts of dibutyl Cellosolve adipate and 1 part of tin fluorborate in a Banbury mixer and form the resultant stiff doughy mass into a cake by subjecting it to a pressure of 250 p. s. i. and a temperature of 275° F. for 30 minutes. Skive a sheet about 0.015" thick from the thus-formed cake and sandwich it between a pair of nickel plated steel sheets. Subject the sandwich to a temperature of 250° F. and a pressure of 250 p. s. i. for 3 minutes and, after cooling the laminate that is formed, separate the metal sheets from the polyvinyl butyral interlayer. This is accomplished only with difficulty and some of the nickel plating is parted from the steel sheet during the process.

When this composition is bonded directly to the surface of steel plates by either of the above methods, equally strong laminates are formed.

Example III

Place 100 parts of polyvinyl butyral resin, 40 parts of dibutyl Cellosolve adipate plasticizer and 1 part of cadmium fluorborate in a Banbury mixer and malaxate until a stiff doughy mass is formed. Sandwich a layer of the dough about 0.1" thick between a pair of chromium plated steel sheets and subject this assembly to a temperature of 275° F. and a pressure of 250 p. s. i. for ten minutes. As a result of this treatment the resin is formed into a solid interlayer that adheres tenaciously to the chromium plating. On separating the metal plates from the resinous interlayer the chromium plating adheres to the interlayer and is torn from the steel sheets.

Form a cake by placing the stiff doughy mass resulting from the malaxation of the above ingredients in the designated proportions in a suitable chase and subjecting it to a temperature of about 275° F. and a pressure of about 185 p. s. i. for 30 minutes. After the thus-formed cake has cooled, skive a sheet about 0.015" thick therefrom and sandwich the sheet between a pair of tin plated steel sheets. Subject the sandwich to a temperature of 300° F. and a pressure of 250 p. s. i. for about 30 seconds. The resinous interlayer is bonded to the tin plating by this procedure, the bond being of a strength such that when the sheet of interlayer is parted from the metal plates, the tin plating is torn from the steel sheets and adheres to the interlayer.

This composition adheres with equal tenacity to the surfaces of steel plates when bonded thereto by the above methods.

The above results are truly surprising since plasticized polyvinyl butyral resins having incorporated therein divalent metal salts of fluorboric acid are generally unsatisfactory as bonding compositions for glass surfaces. When modified polyvinyl acetal resin compositions of this character are laminated to glass surfaces there is a resultant loss of from 50 to 75% of bond strength as compared with unmodified plasticized polyvinyl butyral resin compositions.

The surprising results noted with respect to polyvinyl butyral resin compositions modified with the fluorborates are not obtained with an unmodified mixture of polyvinyl butyral resin and a plasticizer. When a mixture of 100 parts of polyvinyl butyral resin and 40 parts of dibutyl Cellosolve adipate plasticizer is malaxated and formed into a dough and a layer of the dough is bonded to a pair of chromium plated steel sheets by the application thereto of a temperature of 275° F. and a pressure of 250 p. s. i., the resultant laminate is decidedly inferior in strength. The steel plates are parted from the sheet of resinous interlayer with comparative ease and no disruption of the chromium plating occurs.

Example IV

In order to form a composition that may be used to form protective coatings on metal surfaces, add 100 parts of polyvinyl butyral resin and 1 part of tin fluorborate to a mixture of 700 parts butanol and 700 parts xylene. Coat one surface of a steel plate with the thus-formed solution and allow the solvent to evaporate therefrom at room temperature in order to form an adherent coating, the amount of solution used being sufficient to form a coating about 0.3 mil thick when dry. The thus-formed coating is clear and colorless and resistant to moisture and scratching. When the coated steel plate is exposed to an atmosphere of condensing humidity for 24 hours the uncoated surfaces rust whereas the coated surface is unaffected. Similarly, when the plate is subjected to salt spray for 100 hours the uncoated surfaces rust whereas the coated surface is not affected. Paints, varnishes, enamels, lacquers and similar coating materials adhere satisfactorily to coatings prepared from this composition.

The amount of divalent heavy metal salt of fluorboric acid to be added to the polyvinyl acetal resin may be varied in accordance with the use for which the composition is intended and the degree of adhesion that is required. From about 0.2 to 3 parts of fluorborate per 100 parts of polyvinyl acetal resin may be used, the fluorborates being compatible with polyvinyl acetal resins within this range. When less than about 0.2 part of fluorborate per 100 parts of resin is used, no substantial increase in adhesion is obtained and polyvinyl acetal resins are not compatible with more than about 3 parts of fluorborate per 100 parts of resin. Although satisfactory adhesion is obtained, clear and colorless films will not be formed when more than about 1 part of fluorborate per 100 parts of polyvinyl acetal resin is used and, for this reason, it is preferable that from about 0.2 to 1 part of fluorborate per 100 parts of resin be used.

Divalent heavy metal salts of fluorboric acid other than the fluorborates of the examples, or mixtures of such fluorborates may be used with equally satisfactory results. Among the divalent heavy metal salts that may be used are zinc fluorborate, cadmium fluorborate, lead fluorborate, mercury fluorborate, tin fluorborate, etc. Tin fluorborate is relatively more compatible with polyvinyl acetal resins than the other fluorborates and compositions containing this compound constitute a preferred form of the invention.

The polyvinyl acetal resins employed in accordance with the present invention may be made by reacting an aldehyde with a partially or completely hydrolyzed polyvinyl ester. Suitable methods for preparing such resins are set forth in Morrison et al. Reissue Patent No. 20,430, dated June 29, 1937. Polyvinyl acetal resins prepared in this manner may have a certain number of the original ester groups which have not been removed, as well as a certain number of hydroxyl groups which have not been replaced by acetal groups.

Polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower unsubstituted aliphatic aldehydes are preferred. In particular, polyvinyl acetal resins made from unsubstituted saturated aliphatic aldehydes containing less than 6 carbon atoms and especially those made from formaldehyde, acetaldehyde, butyraldehyde and mixtures thereof are preferred.

According to one embodiment of the present invention, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal.

When the acetal is butyraldehyde acetal, the polyvinyl acetal resin will preferably contain, on a weight basis, from 16 to 20% hydroxyl groups, calculated as polyvinyl alcohol, from 0 to 3% acetate groups, calculated as polyvinyl acetate, the balance being substantially butyraldehyde acetal.

When the acetal is formaldehyde acetal, the polyvinyl acetal resin will preferably contain 5 to 8% hydroxyl groups calculated as polyvinyl alcohol, 10 to 16% acetate groups calculated as polyvinyl acetate and the balance formaldehyde acetal.

An example of a polyvinyl acetaldehyde acetal is one containing 7% hydroxyl groups, calculated as polyvinyl alcohol, 17% acetate groups calculated as polyvinyl acetate, and the balance substantially acetaldehyde acetal.

An example of a mixed acetal resin is one which contains 13% hydroxyl groups, calculated as polyvinyl alcohol, from 2 to 6% acetate groups calculated as polyvinyl acetate, and the balance acetaldehyde and butyraldehyde acetal groups in a molar ratio of 65 to 50% acetaldehyde and 35 to 50% butyraldehyde acetal groups.

The type and amount of modifying material to be added to the mixture of divalent heavy metal salt of fluorboric acid and polyvinyl acetal resin is dependent upon the use for which the composition is intended and the method by which it is to be applied. Thus when laminates and similar articles are to be prepared, a suitable amount of plasticizer is added and, when protective coatings are to be prepared, the ingredients are dissolved in a suitable volatile organic solvent or a mixture of a solvent and a diluent.

Any suitable plasticizer may be used in preparing polyvinyl acetal resin compositions useful as interlayers, satisfactory plasticizers including compounds such as triethylene glycol di-2-ethyl butyrate, dibutyl sebacate, dibutyl Cellosolve adipate (dibutoxy ethyl adipate), dialkyl phthalates, triaryl phosphates, etc. The amount of plasticizer to be added to the polyvinyl acetal resin may be varied within wide limits in order to prepare compositions having different initial viscosities and mixtures containing up to 100 parts of plasticizer per 100 parts of polyvinyl acetal resin may be used with satisfactory results.

In order to prepare coating compositions, a polyvinyl acetal resin and a divalent heavy metal salt of fluorboric acid are added to a volatile organic solvent in which the particular polyvinyl acetal resin used is soluble. The fluorborate should be in a finely divided condition in order that it may be uniformly distributed in the solution. When the solution is to be applied by brushing, spraying, dipping, etc., it is preferable that it contain from about 4% to 10% of polyvinyl acetal resin on a weight basis. Larger amounts of resin may be used if desired, as for example, when a highly viscous "dope" useful for home purposes is to be prepared. A wide variety of solvents and mixtures of solvents, numerous examples of which are well known to those skilled in the art, may be used for this purpose. Since all polyvinyl acetal resins will not necessarily dissolve in a given solvent, some care must be exercised in selecting the solvent that is to be used. Suitable solvents in which one or more polyvinyl acetal resins are at least partially soluble include alcohols such as methanol, ethanol, butanol, n-propyl alcohol, isopropyl alcohol, undecyl alcohol, ethoxy ethanol, butoxy ethanol, etc., glycol ethers such as ethylene glycol monomethyl ether, ethylene glycol monophenyl ether, diethylene glycol monobutyl ether, etc., halogenated compounds such as ethylene dibromide, methylene chloride, dichloropentane, etc., ketones such as methyl ethyl ketone, cyclohexanone, etc., furfural, terpenes, dioxane, carbon bisulfide, etc.

Polyvinyl butyral resins are soluble in volatile organic compounds such as methyl alcohol, ethyl alcohol, butyl alcohol, n-propyl alcohol, isopropyl alcohol, cyclohexanol, diacetone alcohol, ethylene glycol monomethyl ether, ethylene dichloride, etc. Volatile organic solvents in which polyvinyl formal resins are soluble include benzyl alcohol, dioxane, ethylene dichloride, methylene chloride, nitrobenzene, nitropropane, trichloroethylene, etc.

It is frequently desirable to add a suitable diluent to the solvent, aromatic and saturated aliphatic hydrocarbons such as xylene, toluene, benzene, haxane, etc., being useful for this purpose.

The polyvinyl acetal resins modified with divalent heavy metal salts of fluorboric acid are highly adherent to metals other than the particular metals used in the example. Satisfactory adhesion is obtained when such compositions are applied to surfaces of iron, steel, nickel, aluminum, tin, chromium, etc.

Articles having metal surfaces are protected against the deleterious effects of exposure by the application thereto of coatings prepared from a solution of a polyvinyl acetal resin and a divalent heavy metal salt of fluorboric acid. Such compositions may be modified for use as anticorrosive wash primers to which overcoats of anticorrosive, anti-fouling or similar protective or decorative coatings will adhere strongly by the incorporation therein of zinc tetra-oxy chromate or other suitable pigment. Preferably, equal amounts by weight of polyvinyl acetal resin and pigment should be used.

When desired, conventional additives such as lubricants, fillers, colorants, etc. may be added to the polyvinyl acetal resin compositions of the present invention.

It is obvious that many variations may be made in the products and process of this invention without departing from the spirit and scope thereof as defined by the appended claims.

What is claimed is:

1. A composition of matter comprising a polyvinyl acetal resin and 0.2 to 3 parts per 100 parts of said resin of a divalent heavy metal salt of fluorboric acid.

2. A composition of matter as in claim 1 wherein the polyvinyl acetal resin is a polyvinyl butyral resin.

3. A composition of matter as in claim 2 wherein the salt is tin fluorborate.

4. A composition of matter as in claim 2 wherein the salt is lead fluorborate.

5. A composition of matter as in claim 2 wherein the salt is cadmium fluorborate.

6. A composition of matter comprising a polyvinyl acetal resin, a plasticizer and 0.2 to 3 parts per 100 parts of said resin of a divalent heavy metal salt of fluorboric acid.

7. A composition of matter as in claim 6 wherein the polyvinyl acetal resin is a polyvinyl butyral resin.

8. A composition of matter as in claim 7 wherein the salt is tin fluorborate.

9. A composition of matter as in claim 7 wherein the salt is lead fluorborate.

10. A composition of matter as in claim 7 wherein the salt is cadmium fluorborate.

11. A composition of matter comprising a volatile organic solvent solution of a polyvinyl acetal resin and 0.2 to 3 parts per 100 parts of said resin of a divalent heavy metal salt of fluorboric acid.

12. A composition of matter as in claim 11 wherein the polyvinyl acetal resin is a polyvinyl butyral resin.

13. A composition of matter as in claim 12 wherein the salt is tin fluorborate.

14. A composition of matter comprising a mixture of xylene and butanol having dissolved therein a polyvinyl butyral resin and 0.2 to 3 parts of tin fluorborate per 100 parts of said resin.

No references cited.